July 1, 1924.
L. H. PECK ET AL
ORE CONCENTRATOR
Filed April 10, 1923
1,499,471
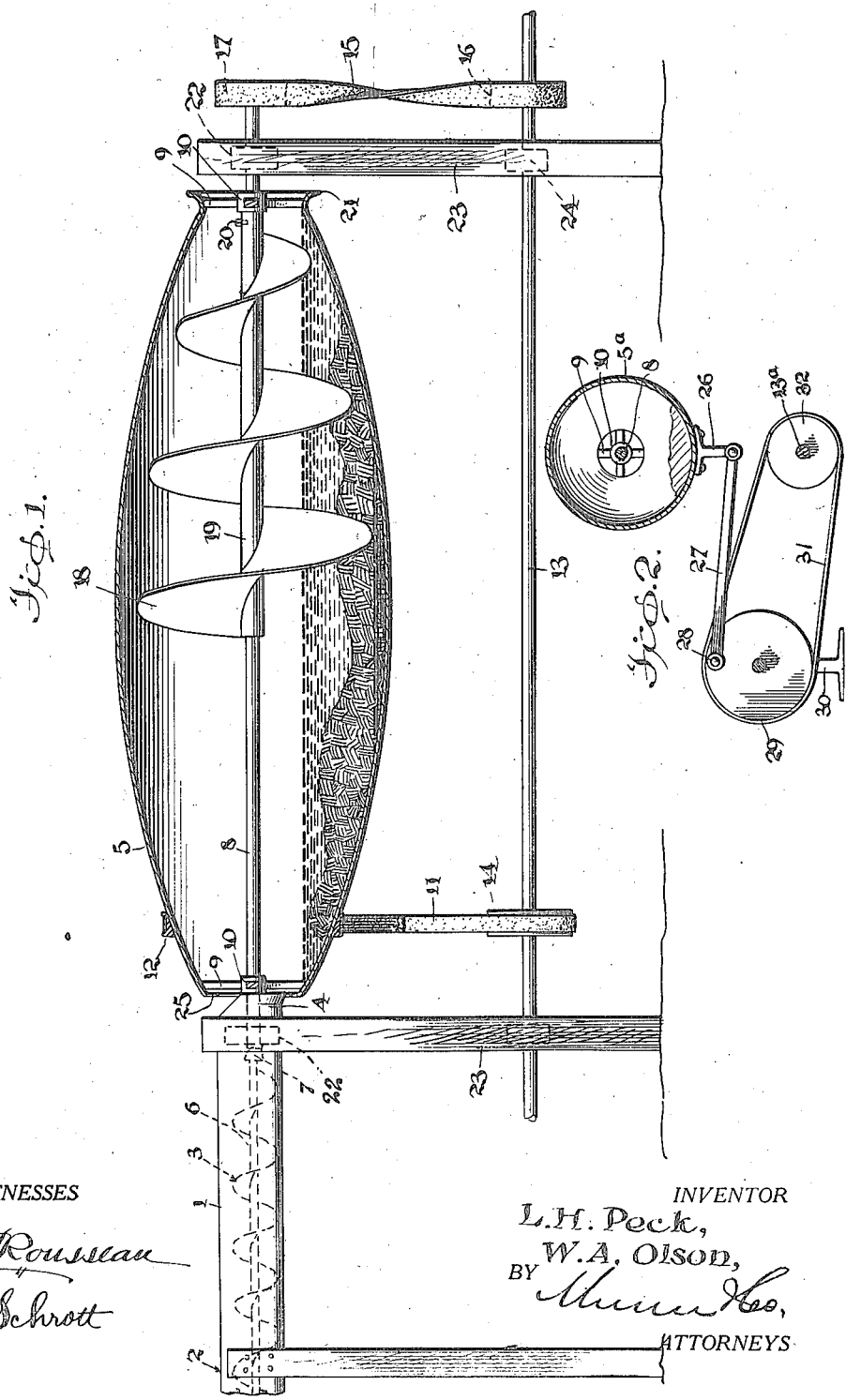

Patented July 1, 1924.

1,499,471

UNITED STATES PATENT OFFICE.

LEWIS HORACE PECK AND WILLIAM ARTHUR OLSON, OF DELTA, UTAH.

ORE CONCENTRATOR.

Application filed April 10, 1923. Serial No. 631,193.

*To all whom it may concern:*

Be it known that we, LEWIS HORACE PECK and WILLIAM ARTHUR OLSON, citizens of the United States, and residents of Delta, in the county of Millard and State of Utah, have invented certain new and useful Improvements in Ore Concentrators, of which the following is a specification.

Our invention relates to improvements in ore concentrators and it consists of the constructions, combinations and mode of operation herein described and claimed.

An object of the invention is to provide a machine to wash gold and platinum from placer sand as originally found.

A further object of the invention is to provide a concentrator for the purpose described, which is designed to operate on a small amount of water, thereby making it advantageous to use the concentrator in arid regions where much good placer sand is often found.

A further object of the invention is to provide a concentrating cylinder of peculiar shape, the purpose of this shape being to aid in the precipitation of the gold.

Other objects and advantages will appear in the following specification, reference being had to the accompanying drawing, in which:

Figure 1 is a longitudinal section of an ore concentrator constructed in accordance with the invention, and Figure 2 is a cross section illustrating a modification wherein the cylinder is oscillated instead of rotated.

In carrying out the invention provision is made of a trough 1 into which the placer sand is dumped at 2, or in fact at any other convenient place along the trough. Operating in the trough is a worm 3 for delivering the sand to the chute 4 which discharges into the concentrating cylinder 5.

Driving motion is imparted to the shaft 6 of the worm 3 by a connection 7 with the concentrator shaft 8. This connection may be in the nature of a universal joint which permits of variations in the position of the worm shaft 6 because there may be circumstances under which the worm shaft may not be in alinement with the concentrator shaft, and under such circumstances, the universal joint will still serve to impart the necessary driving motion to the worm.

Spiders 9 support the cylinder 5. These include bearing boxes 10 through which the shaft 8 passes. The cylinder is not fixed upon the shaft 8 but is relatively movable in respect thereto by virtue of the bearing which the boxes 10 afford. The cylinder 5 is independently driven by a belt 11 which is applied to a pulley 12 on the cylinder. Driving motion is obtained from a power shaft 13 which has a pulley 14 to which the belt 11 is also applied.

A belt 15 is crossed and imparts driving power from a pulley 16 on the shaft 13 to another pulley 17 on the concentrator shaft 8. This shaft carries a worm or auger 18 which extends from the right end of the cylinder 5 to a point approximately in the middle. The cylinder 5 is intended to rotate at a lower rate of speed, approximately ten to fifteen R. P. M. while the worm 18 is adapted to move at a higher rate of speed, approximately twenty to thirty R. P. M. The cylinder rotates in one direction while the shaft 8 rotates in the other.

The worm 18 is carried by a sleeve 19 which is fixed upon the shaft 8 by a thumb screw 20. This arrangement permits of longitudinal adjustment of the worm should such become necessary. The screw 20 is readily accessible from the open flared end 21 of the cylinder. It should be mentioned in passing that the concentrator shaft 8 is journaled in bearings 22 which are suitably carried by supports 23. Bearings 24 are also mounted on these supports, and carry the main power shaft 13.

Reference is made to Fig. 2 which illustrates a modification wherein the cylinder 5 is adapted to be oscillated instead of rotated as in Fig. 1. Here the cylinder 5$^a$ has a bracket 26 underneath, with which a pitman 27 is connected, the other end of the pitman being connected at 27 to a pulley 29. This pulley is journaled on a stand 30. The pulley is driven by a belt 31 from a pulley 32 on the drive shaft 13$^a$. The amount of rocking or oscillating motion of the cylinder 5$^a$ will depend on the distance that the wrist pin 28 is placed from the center of the pulley 29. This may be regulated as desired, but in any event, the rotation of the pulley 29 will produce a rocking or oscillation of the cylinder while the worm rotates continuously.

The operation will be readily understood from the following additional description. As stated before, the placer sand is discharged into the trough 1 through which it is conducted by the worm 3. The conduction of the sand is assisted by a small stream of water which may be introduced in any suitable manner. The water scours the sand and loosens the gold for separation.

A feature of the invention is that but a small amount of water is necessary for the proper operation of the concentrator. This feature is of great advantage when the concentrator is used in arid regions where good placer sand abounds but where water is scarce. The mixture of water and sand is discharged at the chute 4 into the left open end of the cylinder 5. Mention is made above of the peculiar shape of the cylinder. It is of a bulging shape, being gradually rounded from the ends of relatively small diameter to the point of greatest diameter in approximately the center of the cylinder. It is to be observed that the worm 18 is shaped to conform with one half of the bulging cylinder.

In order that the water may not overflow the cylinder 5 at the left or entrance end, provision is made of a circular flange 25 which forms an effective shield. The flange extends inwardly into proximity with the chute 4. As has already been described, the outlet 21 is made differently, the point at which the water will overflow being considerably lower than the innermost extremity of the flange 25. When deposited into the cyinder, the sand will gradually work toward the lowermost part of the cylinder 5 i. e. the place of most bulge, where it will be agitated by the worm 18. The sand will be carried off toward the outlet by virtue of the action of the worm but the gold will be left deposited at the bottom of the cylinder by virtue of its own weight. The reader will see that gravitation plays a large part in the precipitation of the gold. The concentrator is admirably adapted to the use of mercury in assisting the separation of finely divided or "flour" gold.

In case the modified form shown in Fig. 2 is employed, use is made of means which will oscillate the cylinder instead of rotate it as in Fig. 1. Such means consists of the pulley 29 which operates the pitman 27 with a crank motion. The oscillation of the cylinder then occurs while the worm, which will be like the worm 18 in Figure 1, rotates with a continuous motion.

While the construction and arrangement of the improved ore concentrator as herein described and claimed is that of a generally preferred form, obviously modifications and changes may be made without departing from the spirit of the invention or the scope of the claims.

We claim:—

1. An ore concentrator comprising a sand trough, a chute at the discharge end of the trough, a cylinder having an opening into which the chute discharges, a shaft extending through the cylinder, means by which it is supported, spiders carried by the cylinder having boxes furnishing bearing for the cylinder on the shaft, means for rotating the cylinder independently of the shaft, means for rotating the shaft in the opposite direction and at a different speed from that of the cylinder, a worm in the trough, means by which the worm is connected to the shaft, and a worm on the shaft in the cylinder adapted to agitate sand and move it toward the discharge end of the cylinder.

2. An ore concentrator comprising supporting means, a sand trough mounted on said supporting means, a shaft journalled in bearings on said supporting means, a cylinder having a bulging shape providing a central receptacle for the accumulation of gold, spiders in the ends of the cylinders including boxes which have independent bearing on the shaft, means by which the cylinder is rotated upon the shaft, means by which the shaft is rotated at a different speed and in a different direction from that of the cylinder, a worm carried by said shaft occupying substantially one-half the length of the cylinder and being of a shape to approximately conform to the shape of the cylinder, means by which the worm is adjustably mounted on the shaft, a chute leading from the sand trough into the cylinder, a flange at the entrance end of the cylinder extending in proximity with the chute, a flared end at the outlet of the cylinder facilitating the overflow of water, a worm operating in the sand trough to feed sand into the chute, and a universal joint between the sand trough worm and the shaft in the cylinder.

3. An ore concentrator comprising a cylinder for receiving sand and the like and water, a shaft extending along the axis of the cylinder from end to end, means carried by the cylinder having bearing on the shaft, means for revolving the shaft, means for moving the cylinder independently of the shaft, a trough discharging into the cylinder at one end, a worm operable in said trough, and a universal connecting joint between the shaft and worm whereby the worm is driven, said joint compensating for differences of levels of the trough and cylinder.

4. An ore concentrator comprising a worm shaft, bearings in which said shaft is revoluble, a cylinder having spiders terminating in bearings receiving the shaft upon which it is independently movable, means for revolving the respective shaft and cylinder, a trough having a chute discharging into one end of the cylinder, a worm operable in said trough, and a universal joint connecting the shaft with the worm at a place within the trough, said joint compensating for differences in the level of the trough in respect to the cylinder.

LEWIS HORACE PECK.
WILLIAM ARTHUR OLSON.